United States Patent
Li et al.

(10) Patent No.: US 9,077,819 B2
(45) Date of Patent: Jul. 7, 2015

(54) TRANSMISSION POWER CONTROL METHOD

(75) Inventors: Yuan-Hwa Li, Hsinchu County (TW); Ching-Kae Tzou, Hsinchu County (TW); Dong-Ming Chuang, Hsinchu County (TW)

(73) Assignee: MEDIATEK INC., Science-Based Industrial Park, Hsin-Chu (TW)

(*) Notice: Subject to any disclaimer, the term of this patent is extended or adjusted under 35 U.S.C. 154(b) by 163 days.

(21) Appl. No.: 13/316,578

(22) Filed: Dec. 12, 2011

(65) Prior Publication Data
US 2012/0258760 A1    Oct. 11, 2012

Related U.S. Application Data

(60) Provisional application No. 61/474,244, filed on Apr. 11, 2011.

(51) Int. Cl.
| H04B 7/00 | (2006.01) |
| H04M 11/06 | (2006.01) |
| H04L 25/02 | (2006.01) |

(52) U.S. Cl.
CPC ......... *H04M 11/062* (2013.01); *H04L 25/0202* (2013.01)

(58) Field of Classification Search
CPC .................. H04L 25/0202; H04M 11/062
USPC .................................. 455/522, 402
See application file for complete search history.

(56) References Cited

U.S. PATENT DOCUMENTS

| 7,885,228 B2* | 2/2011 | Walton et al. ................. 370/329 |
| 8,140,049 B2* | 3/2012 | Schwager et al. ................ 700/9 |
| 2007/0002772 A1* | 1/2007 | Berkman et al. ............. 370/257 |
| 2008/0260010 A1 | 10/2008 | Schwager |
| 2009/0161784 A1* | 6/2009 | Stadelmeier et al. ......... 375/267 |
| 2009/0310572 A1 | 12/2009 | Wang |
| 2010/0265895 A1 | 10/2010 | Bracha |

FOREIGN PATENT DOCUMENTS

CN         101036313 A        9/2007

* cited by examiner

*Primary Examiner* — Wesley Kim
*Assistant Examiner* — Raj Chakraborty
(74) *Attorney, Agent, or Firm* — Winston Hsu; Scott Margo

(57) ABSTRACT

The present invention discloses a transmission power control method for a communication system comprising a transmitter and a plurality of receivers. The transmitter is coupled to the plurality of receivers via a plurality of corresponding outgoing links. The transmission power control method comprising steps of each of the plurality of receivers performing channel estimation for each of the plurality of corresponding outgoing links, and replying a first suggested transmission power back-off level to the transmitter; and the transmitter determining a new transmission power back-off level after collecting a plurality of first suggested transmission power back-off levels from the plurality of receivers.

16 Claims, 6 Drawing Sheets

TRANSMISSION POWER CONTROL METHOD

CROSS REFERENCE TO RELATED APPLICATIONS

This application claims the benefit of U.S. Provisional Application No. 61/474,244, filed on Apr. 11, 2011 and entitled "Power Back-off Scheme for a Communication System", the contents of which are incorporated herein by reference.

BACKGROUND OF THE INVENTION

1. Field of the Invention

The present invention relates to a transmission power control method, and more particularly, to a transmission power control method for a communication system capable of considering path losses of all outgoing channels from a transmitter to receivers, to negotiate a power back-off level which avoids the hidden-node problem, so as to effectively increase power efficiency and data rate of the communication system.

2. Description of the Prior Art

Transmission power back-off technology has been proposed to either increase data rate or reduce power consumption or electromagnetic radiation. However, determining the transmission power back-off level has been a challenge in communication systems that could suffer from the hidden-node problem.

Specifically, since the signal to noise ratio (SNR) dynamic range of an Analog-to-Digital (A/D) converter at a receiver is limited, the transmission power spectral density (PSD) adjustment, the aggregate transmission power adjustment or the gain scaling adjustment will generate better SNR at receiving side at some parts of subcarriers. Accordingly, receiver's throughput will be increased.

For example, please refer to FIG. 1A to FIG. 1B. FIG. 1A is a schematic diagram of a non-flat transmit PSD mask of a powerline communication (PLC) system, wherein PSD masks corresponding to different frequency bands are −55, −85 and −120 dBm/Hz, respectively. FIG. 1B is a schematic diagram of SNR of signals received by a receiver of the PLC system when utilizing the non-flat transmit PSD mask in FIG. 1A. As shown in FIG. 1A, in order to comply with the regulation of a country, the transmit PSD mask of the PLC system may not be flat, and the PSD mask for some active subcarriers could be lower than that for the other active subcarriers, e.g. the PSD mask of a high frequency band is lower than the PSD mask of a low frequency band. In certain cases without transmit PSD adjustment as shown in FIG. 1A, an analog automatic gain control (AGC) setting on the receiver can not drive the channel noise above the quantization noise level of an A/D converter for all frequency tones due to limited dynamic range of the converter, and thus those subcarriers with lower reference PSD have lower SNR as shown in FIG. 1B (lower than 25 dB). In other words, since signals in the low frequency band have high transmission power and thus the AGC can only provide a low gain to prevent saturation of the A/D converter, signals in the high frequency band with low transmission power can not be amplified by the AGC with a high gain and thus have low SNR.

On the other hand, please refer to FIG. 1C and FIG. 1D. FIG. 1C is a schematic diagram of a non-flat transmit PSD mask of the PLC system applied with low-band transmission power back-off, wherein PSD masks corresponding to different frequency bands are −65, −85 and −120 dBm/Hz, respectively. FIG. 1D is a schematic diagram of SNR of signals received by the receiver of the PLC system when utilizing the non-flat transmit PSD mask shown in FIG. 1C. As shown in FIG. 1C, if low-band transmission power back-off is applied (10 dBm lower), SNRs of those subcarriers with lower reference PSD masks can be improved significantly (10 dB higher) In other words, if transmission power of signals in the low frequency band is reduced, the AGC can provide higher gain without saturation of the A/D converter, and thus signals in the high frequency band can have higher SNR.

Besides, transmission power back-off has also been suggested to reduce power consumption or electromagnetic radiation. The document IEC CISPR 22 Amd.1 CIS/I/301/CD defines the maximum transmit PSD as a function of the differential mode insertion loss between the equipment under test (EUT) and the auxiliary equipment (AE) for PLC devices. The maximum transmit PSD is −55, −63, and −73 dBm/Hz for channels of insertion losses of >=40, 30, and 20 dB, respectively. It was verified that these PSD limitations will not have any negative impact for well designed PLC devices with a high dynamic range.

As can be seen from the above, the transmitter needs to know a power back-off level that maximizes the benefit of transmission power back-off. However, careless transmission power back-off may result in the hidden-node problem that an on-going packet may be interfered by some distant node which cannot hear the signal from the packet transmitter since transmission power of the signal from the packet transmitter is reduced too much for the distant node to hear due to path loss.

Although the channel estimation procedure for a point-to-point communication, e.g. Ethernet or Digital subscriber line (DSL), in the prior art is effective to provide the characteristics of the communication channel between link partners, each channel is composed of two unidirectional links. During the conventional channel estimation procedure, the transmitter of a link sends sound packets to the receiver; the receiver estimates the channel characteristics and feed the information back to the transmitter; the transmitter utilizes the channel characteristics to optimize the transmission efficiency. The most important channel characteristic probed by this channel estimation procedure is the tone maps, which defines the bit-loading of each tone over an AC cycle. However, such method is not enough to prevent the hidden-node problem since this method only collects information between link partners without considering other listeners on the medium.

Moreover, the PLC system has unique channel characteristics and access scheme, which complicates the transmission power control (TPC) scheme for the PLC system. First, rather than the simple point-to-point connection such as Ethernet, a powerline has complex channel response due to branches or structures similar to bridge taps. Second, powerline is a shared medium for multiple stations and is subject to the hidden-node problem. Third, the channel characteristics change with the AC cycle, i.e. loading and circuit structure change over AC cycles. The bit allocation over the bandwidth of the cyclostationary channel needs complicated tone map management.

Since PLC has the difficulties above, the conventional TPC approaches are not capable for PLC systems. The schemes based on cable length estimation can not work for complex powerline topology and provide no noise information. The schemes purely based on the receiver's measurement will introduce new hidden nodes. Other approaches, such that considering both channel and crosstalk information or per-tone signal and noise power, do not consider the overall channel characteristics and are subject to hidden-node problem. Thus, there is a need to improve over those prior arts.

SUMMARY OF THE INVENTION

It is therefore an objective of the present invention to provide a transmission power control method for a communication system capable of considering path losses of all outgoing channels from a transmitter to receivers, to negotiate a power back-off level which avoids the hidden-node problem, so as to effectively increase power efficiency and data rate of the communication system.

The present invention discloses a transmission power control method for a communication system comprising a transmitter and a plurality of receivers. The transmitter is coupled to the plurality of receivers via a plurality of corresponding outgoing links. The transmission power control method comprising steps of each of the plurality of receivers performing channel estimation for each of the plurality of corresponding outgoing links, and replying a first suggested transmission power back-off level to the transmitter; and the transmitter determining a new transmission power back-off level after collecting a plurality of first suggested transmission power back-off levels from the plurality of receivers.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
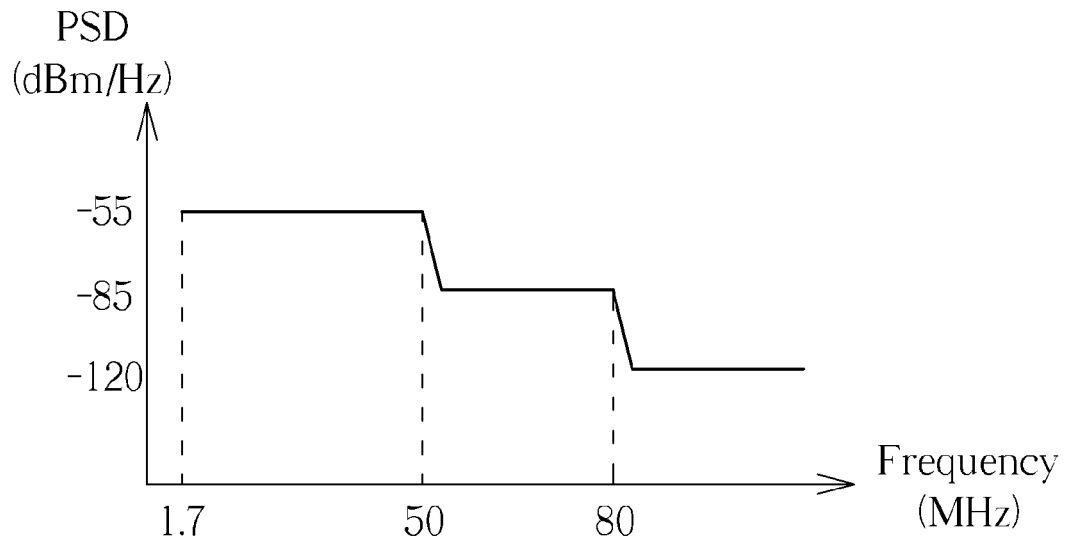
FIG. 1A is a schematic diagram of a non-flat transmit PSD mask of a powerline communication system.
Figure 1B:
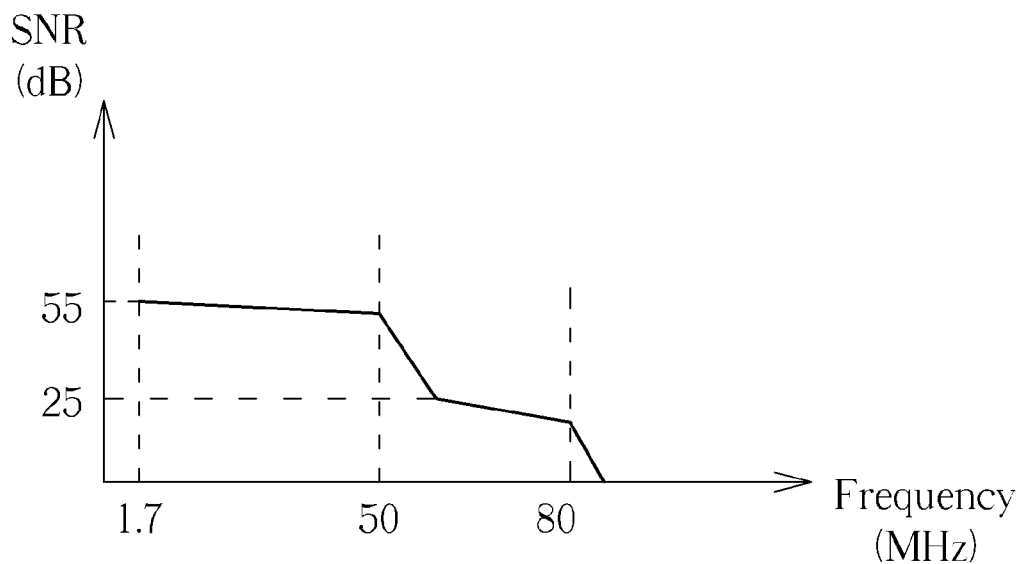
FIG. 1B is a schematic diagram of SNR of signals received by a receiver of the PLC system when utilizing the non-flat transmit PSD mask shown in FIG. 1A.
Figure 1C:
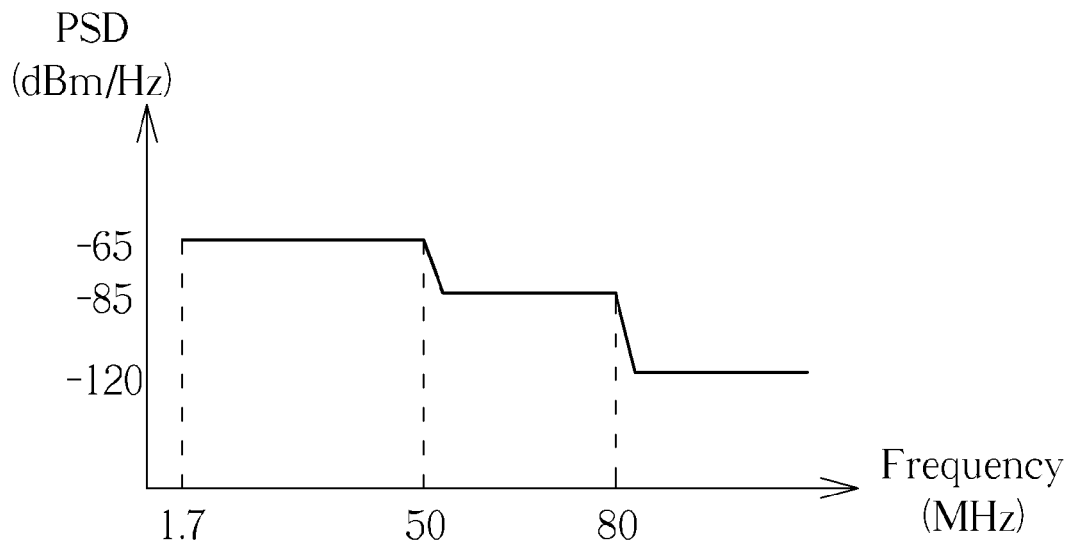
FIG. 1C is a schematic diagram of a non-flat transmit PSD mask of the PLC system applied with low-band transmission power back-off.
Figure 1D:
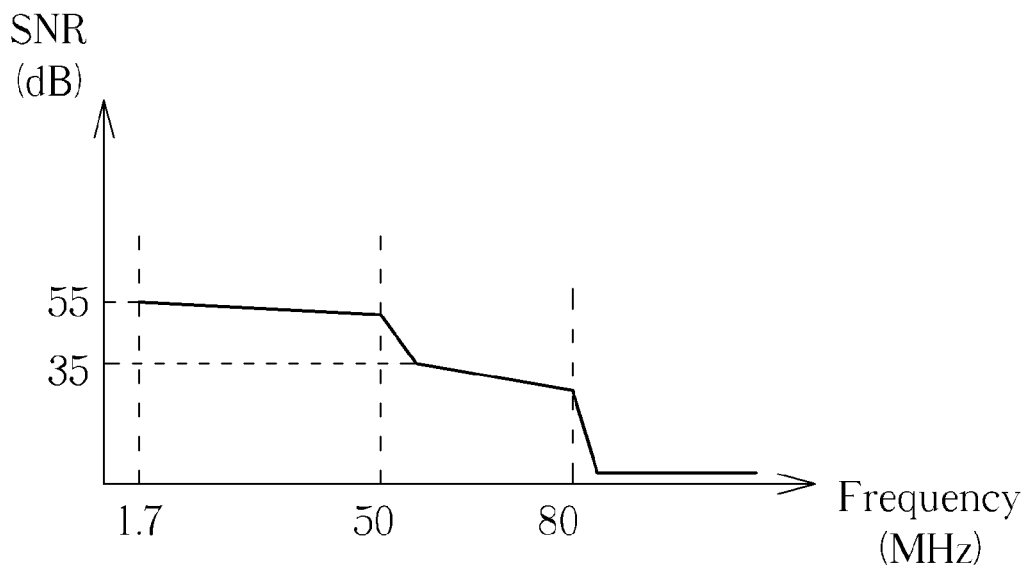
FIG. 1D is a schematic diagram of SNR of signals received by the receiver of the PLC system when utilizing the non-flat transmit PSD mask shown in FIG. 1C.
Figure 2:
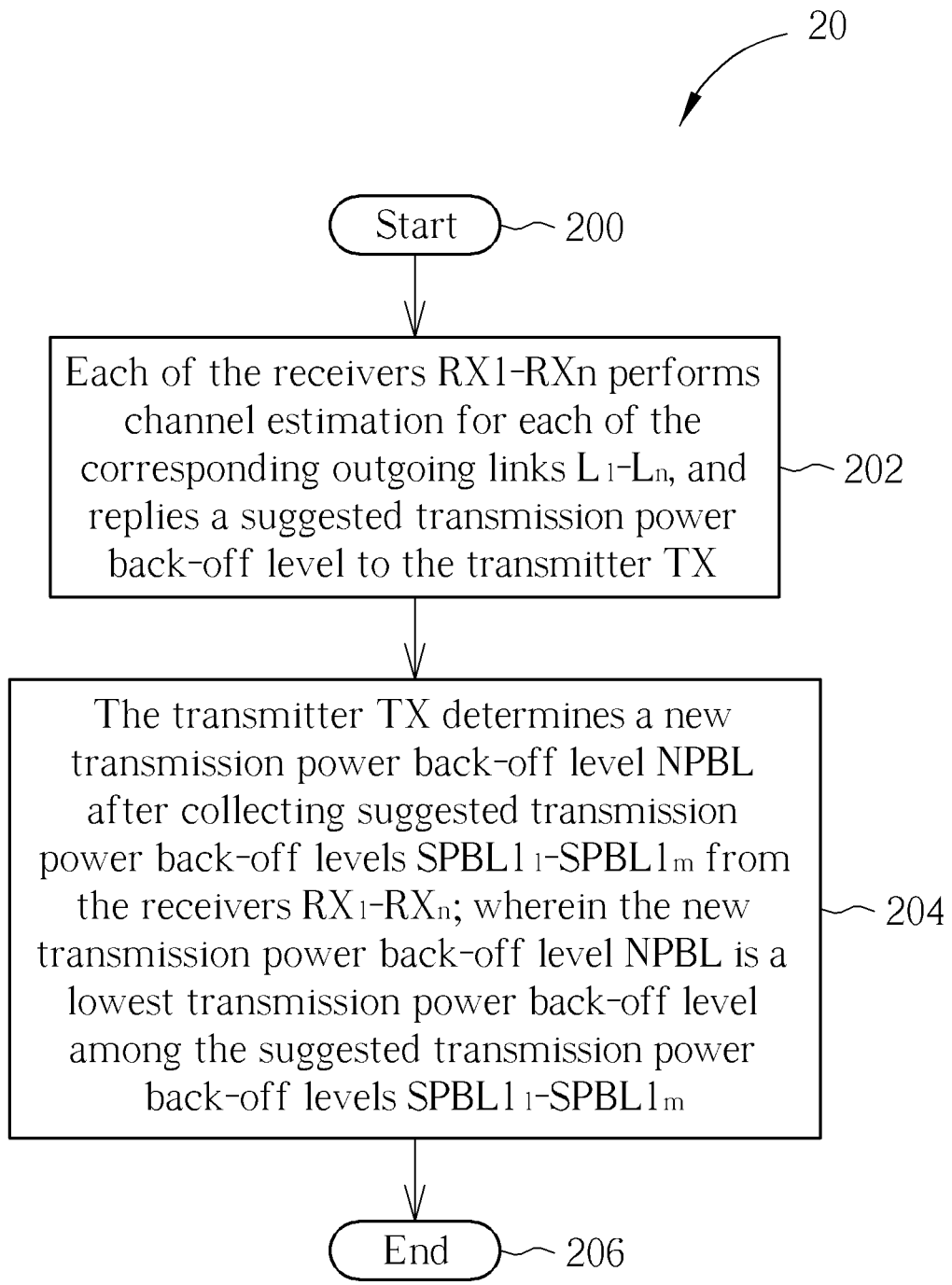
FIG. 2 is a schematic diagram of a transmission power control process 20 for a communication system according to an embodiment of the present invention.

Please refer to FIG. 2, which is a schematic diagram of a transmission power control process 20 for a communication system according to an embodiment of the present invention. The communication system is preferably a powerline communication (PLC) system, and includes a plurality of stations, i.e. each station in turn acts as a transmitter TX and a receiver $RX_1$-$RX_n$ since only one station should transmit data at a time. The transmitter TX is coupled to the receivers $RX_1$-$RX_n$ via corresponding outgoing links $L_1$-$L_n$. The transmission power control process 20 includes follow steps:

Step 200: Start.

Step 202: Each of the receivers $RX_1$-$RX_n$ performs channel estimation for each of the corresponding outgoing links $L_1$-$L_n$, and replies a suggested transmission power back-off level to the transmitter TX.

Step 204: The transmitter TX determines a new transmission power back-off level NPBL after collecting suggested transmission power back-off levels $SPBL1_1$-$SPBL1_m$ from the receivers $RX_1$-$RX_n$; wherein the new transmission power back-off level NPBL is the lowest transmission power back-off level among the suggested transmission power back-off levels $SPBL1_1$-$SPBL1_m$.

Step 206: End.

According to the transmission power control process 20, a receiver $RX_a$ of the receivers $RX_1$-$RX_n$ performs channel estimation for a corresponding outgoing links $L_a$ of the corresponding outgoing links $L_1$-$L_n$, and replies channel characteristics $CC1_a$ of the outgoing link $L_a$, comprising a suggested transmission power back-off level $SPBL1_a$ which maximizes power efficiency on the outgoing links $L_a$, to the transmitter TX. Then, the transmitter TX can determine a new transmission power back-off level NPBL after collecting channel characteristics of the outgoing links $L_1$-$L_n$, comprising suggested transmission power back-off levels $SPBL1_1$-$SPBL1_m$, from the receivers $RX_1$-$RX_n$, wherein the new transmission power back-off level NPBL is the lowest transmission power back-off level among the suggested transmission power back-off levels $SPBL1_1$-$SPBL1_m$. Under such a situation, since the new transmission power back-off level NPBL is the lowest transmission power back-off level among the suggested transmission power back-off levels $SPBL1_1$-$SPBL1_m$ collected from the receivers $RX_1$-$RX_n$, the transmitter TX can utilize the new transmission power back-off level NPBL and corresponding tone maps NTM for continuing transmission such that all the receivers $RX_1$-$RX_n$ can hear transmitted packets. As a result, the present invention can maximize the benefit of transmission power back-off to increase power efficiency and data rate while avoiding hidden-node problem by considering path losses of all the outgoing links $L_1$-$L_n$ from the transmitter TX.

Noticeable, the new transmission power back-off level NPBL can be per outgoing link or identical for all the outgoing links as long as all the receivers $RX_1$-$RX_n$ can hear. Besides, the new transmission power back-off level NPBL for an outgoing link can be per tone (a specific frequency), per band (for a range of tones), or identical for a complete band since the benefit of transmission power back-off can be achieved by reducing transmission power only on some tones under some circumstances, e.g. the receiver $RX_a$ determines power of received sounding packets is high only on a specific frequency or a range of tones after channel attenuation, or transmission power reduction of low band (<30 MHz) in the PLC system.

In detail, the transmitter TX initiates a sounding procedure $SP_1$ according to a current transmission power back-off level CPBL to send sound packets $SPT_1$ to the receiver $RX_a$ first, and then the receiver $RX_a$ estimates the channel characteristics $CC1_a$, comprising tone maps CTM for the current transmission power back-off level CPBL and the suggested transmission power back-off level $SPBL1_a$, and replies the transmitter TX with the channel characteristics $CC1_a$. Noticeably, if the sounding procedure $SP_1$ is a first round of the sounding procedure initiated by the transmitter TX for channel estimation, the current transmission power back-off level CPBL is zero, i.e. the transmitter TX initiates the sounding procedure $SP_1$ with full transmission power, according to regulation, to send the sound packets $SP_1$ to the receiver $RX_a$.

Then, in order to get sufficient channel information for determining the new transmission power back-off level NPBL while avoiding the hidden node problem, suggested transmission power back-off levels $SPBL1_1$-$SPBL1_m$ collected by the transmitter TX for determination is preferably suggested transmission power back-off levels $SPBL1_1$-$SPBL1_n$ of all of the outgoing links $L_1$-$L_n$, but can be suggested transmission power back-off levels of a portion of the outgoing links $L_1$-$L_n$ collected within a time limit, or suggested transmission power back-off levels of a portion of the outgoing links $L_1$-$L_n$ exceeding some threshold as well.

Afterwards, the transmitter TX can initiate a sounding procedure $SP_2$ according to the new transmission power back-off level NPBL to send sound packets $SPT_2$ to the receiver $RX_a$ if the new transmission power back-off level NPBL is different from the current transmission power back-off level CPBL, and then the receiver $RX_a$ estimates channel characteristics $CC2_a$, comprising the tone maps NTM for the new transmission power back-off level NPBL and optionally a suggested transmission power back-off level $SPBL2_a$, and replies the transmitter TX with the channel characteristics $CC2_a$. Thus, the transmitter TX can utilize the new transmission power back-off level NPBL and the corresponding tone maps NTM for continuing transmission.

Noticeably, if the suggested transmission power back-off level $SPBL2_a$ is different from the new transmission power back-off level NPBL, e.g. a noise undetected by the receiver $RX_a$ when utilizing full transmission power (an automatic gain control provides a lower gain) is detected by the receiver $RX_a$ when utilizing the new transmission power back-off level NPBL (the automatic gain control provides a higher gain) and the receiver $RX_a$ suggests the suggested transmission power back-off level $SPBL2_a$ higher than the new transmission power back-off level NPBL, the transmitter TX reinitiates another round of sounding procedure to determine the new transmission power back-off level NPBL again according to the suggested transmission power back-off level $SPBL2_a$ and the suggested transmission power back-off levels $SPBL1_1$-$SPBL1_m$.

Under such a situation, channel characteristics are incrementally collected by all stations (each acting as the transmitter TX in turn) using existing sounding procedures. All the stations can maintain a database of the channel characteristics estimated by the corresponding receivers $RX_1$-$RX_n$ of outgoing link $L_1$-$L_n$. The new transmission power back-off level NPBL is determined so that the transmitted signal can be heard by all receivers $RX_1$-$RX_n$. Noticeably, when a new station joins the communication system, each station acts as the transmitter TX to initiate a sounding procedure with the new station which acts as a new receiver to adjust the new transmission power back-off level NPBL. (The new station starts with an empty database of channel characteristics.) The receivers $RX_1$-$RX_n$ of the link partners estimate the channel property and feed that information back to the transmitters TX. The transmitters TX collect the channel characteristics and determine another new transmission power back-off level NPBL that can be perceived by all receivers $RX_1$-$RX_n$, including the new station acting as a receiver. The new station also acts as the transmitter TX to collect the channel characteristics and finally determines the new transmission power back-off level NPBL for itself. As a result, the present invention can maximize the benefit of transmission power back-off to increase power efficiency and data rate while avoiding hidden-node problem by considering path losses of all the outgoing links $L_1$-$L_n$ from the transmitter TX.

Noticeably, the spirit of the present invention is that the transmitter TX collects channel characteristics comprising the suggested transmission power back-off levels $SPBL1_1$-$SPBL1_m$ of the outgoing links $L_1$-$L_n$ from the receivers $RX_1$-$RX_n$ via the sounding procedure, and then utilizes the new transmission power back-off level NPBL, which is the lowest among the suggested transmission power back-off levels $SPBL1_1$-$SPBL1_m$, and corresponding tone maps NTM for continuing transmission such that all the receivers $RX_1$-$RX_n$ can hear transmitted packets without hidden node problem while maximizing the benefit of transmission power back-off to increase power efficiency and data rate. Those skilled in the art should make modifications or alterations accordingly. For example, the transmission power control process 20 is preferably applied in a PLC system, but can be applied in other communication system with a hidden terminal problem. Besides, the transmission power control process 20 can be presented in other forms according to different perspective.

Figure 3A:
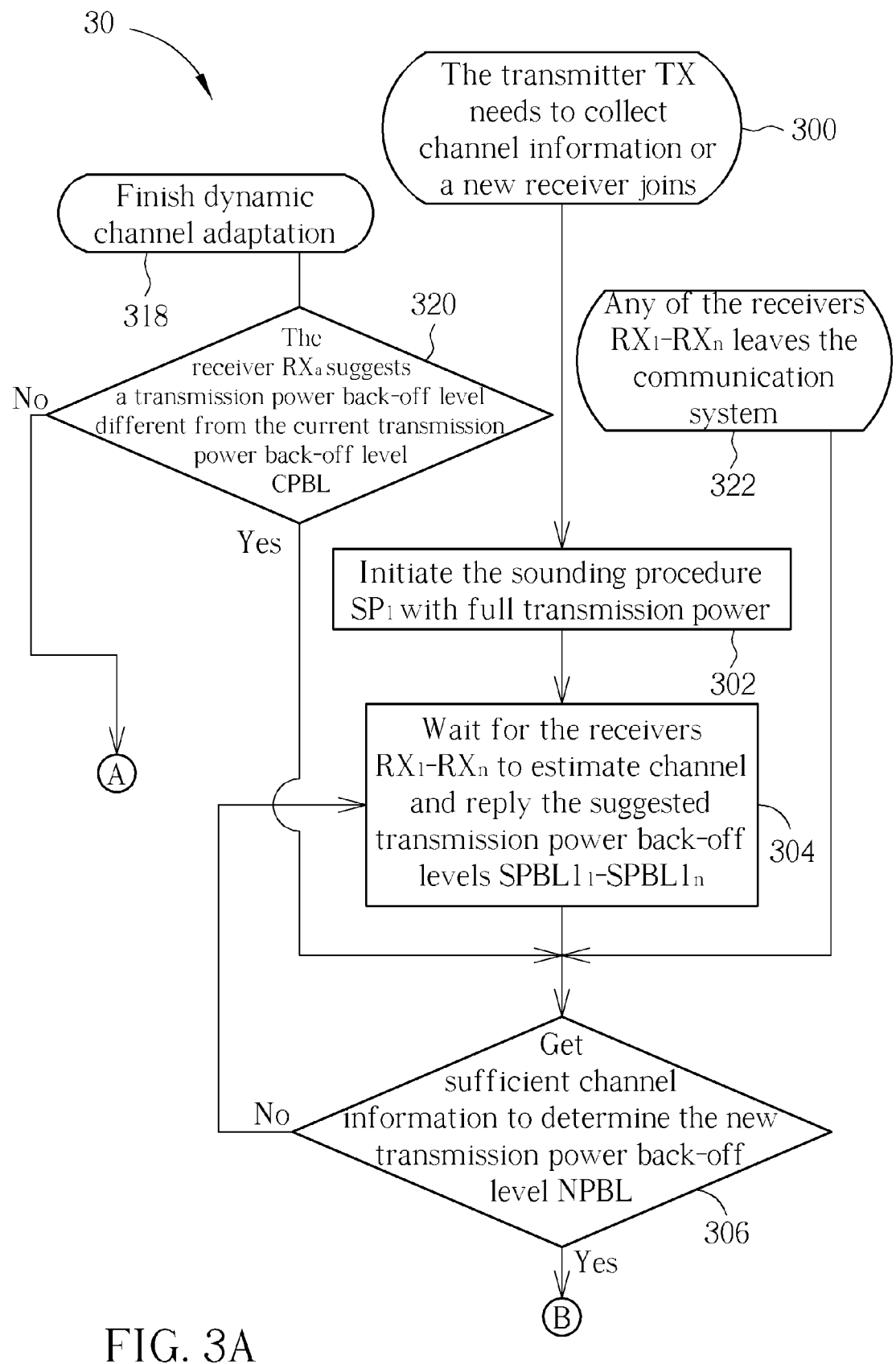
FIG. 3A and FIG. 3B are schematic diagrams of detail operations of a transmission power control process from a perspective of a transmitter according to an embodiment of the present invention.
Figure 3B:
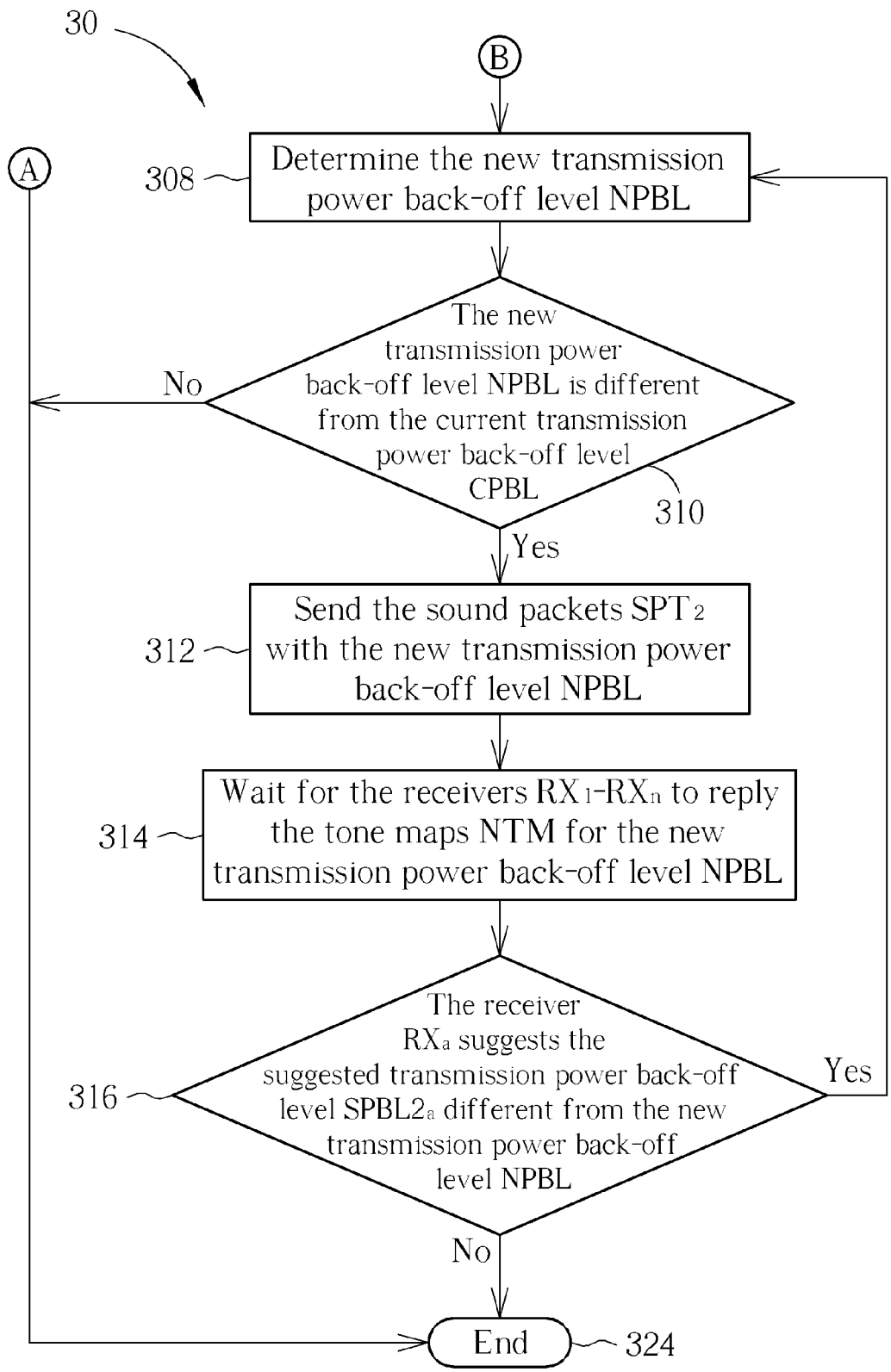

For example, please refer to FIG. 3A and FIG. 3B, which are schematic diagrams of detail operations of a transmission power control process 30 from a perspective of the transmitter TX according to an embodiment of the present invention. The transmission power control process 30 includes following steps:

Step 300: The transmitter TX needs to collect channel information or a new receiver joins.

Step 302: The transmitter TX initiates the sounding procedure $SP_1$ with full transmission power.

Step 304: The transmitter TX waits for the receivers $RX_1$-$RX_n$ to estimate channel and reply the suggested transmission power back-off levels $SPBL1_1$-$SPBL1_n$.

Step 306: The transmitter TX determines whether getting sufficient channel information to determine the new transmission power back-off level NPBL. If yes, go to step 308; otherwise, go to step 304.

Step 308: The transmitter TX determines the new transmission power back-off level NPBL.

Step 310: The transmitter TX determines whether the new transmission power back-off level NPBL is different from the current transmission power back-off level CPBL. If yes, go to step 312; otherwise, go to step 324.

Step 312: The transmitter TX sends the sound packets $SPT_2$ with the new transmission power back-off level NPBL.

Step 314: The transmitter TX waits for the receivers $RX_1$-$RX_n$ to reply the tone maps NTM for the new transmission power back-off level NPBL.

Step 316: The transmitter TX determines whether the receiver $RX_a$ suggests the suggested transmission power back-off level $SPBL2_a$ different from the new transmission power back-off level NPBL. If yes, go to step 308; otherwise, go to step 324.

Step 318: The transmitter TX finishes dynamic channel adaptation.

Step 320: The transmitter TX determines whether the receiver $RX_a$ suggests a transmission power back-off level different from the current transmission power back-off level CPBL. If yes, go to step 306; otherwise, go to step 324.

Step 322: Any of the receivers $RX_1$-$RX_n$ leaves the communication system.

Step 324: End.

Detail of the transmission power control process 30 can be derived by referring to the above description.

Figure 4:
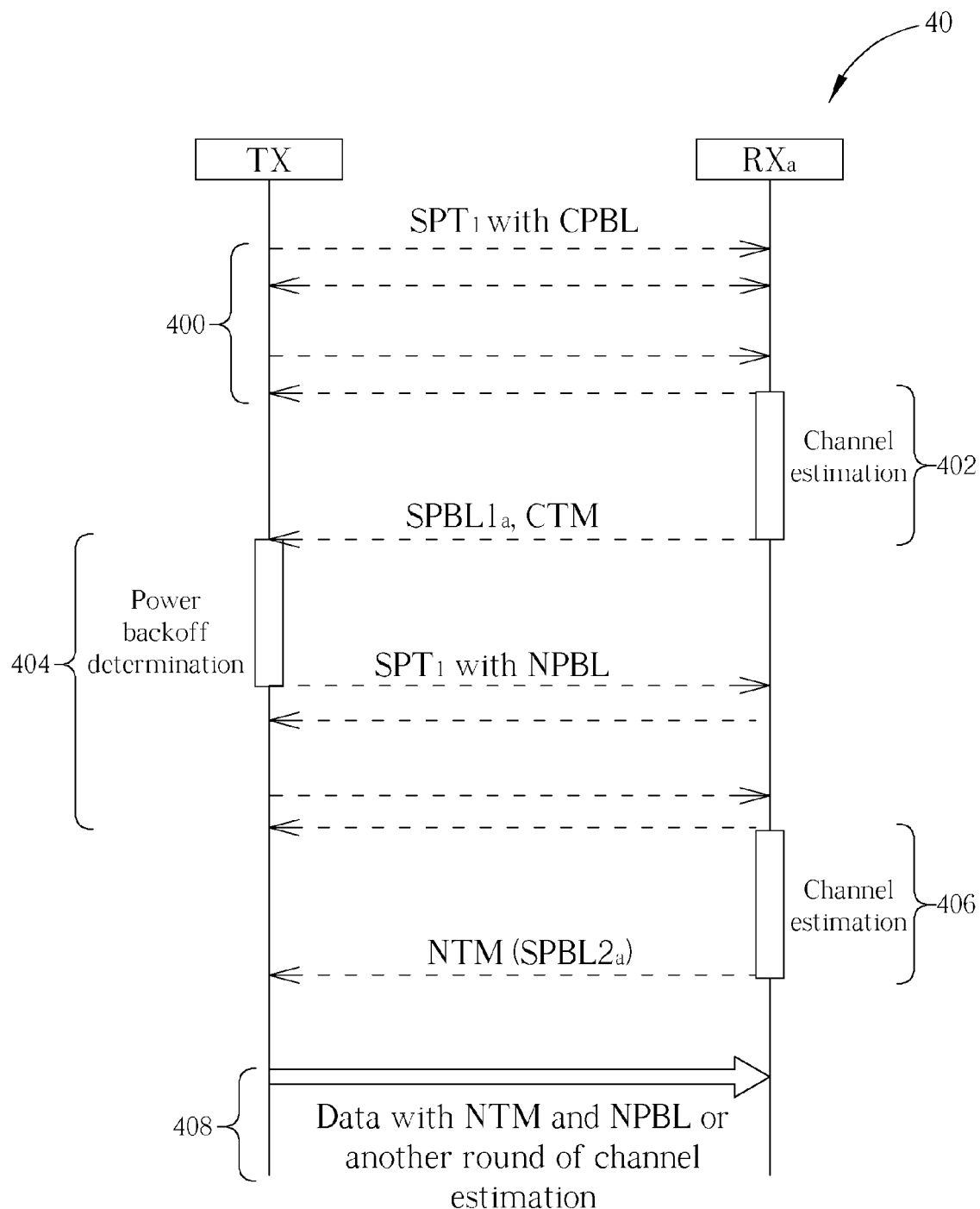
FIG. 4 is a schematic diagram of an operating sequence of a transmission power control process between a transmitter and a receiver according to an embodiment of the present invention.

For another example, please refer to FIG. 4, which is a schematic diagram of an operating sequence of a transmission power control process 40 between the transmitter TX and the receiver $RX_a$ according to an embodiment of the present invention. The transmission power control process 40 includes following steps:

Step 400: The transmitter TX initiates the sounding procedure $SP_1$ according to the current transmission power back-off level CPBL.

Step 402: The receiver $RX_a$ estimates channel and replies the suggested transmission power back-off level $SPBL1_a$.

Step 404: The transmitter TX determines the new transmission power back-off level NPBL after collecting enough channel information. The transmitter TX initiates the sounding procedure $SP_2$ according to the new transmission power back-off level NPBL if the new transmission power back-off level NPBL is different from the current transmission power back-off level CPBL.

Step 406: The receiver $RX_a$ estimates channel and replies the tone maps NTM for the new transmission power back-off level NPBL and optionally the suggested transmission power back-off level $SPBL2_a$.

Step 408: The transmitter TX utilizes the tone maps NTM for the new transmission power back-off level NPBL for continuing transmission, or reinitiates another round of sounding procedure for channel estimation if the suggested transmission power back-off level $SPBL2_a$ is different from the new transmission power back-off level NPBL.

According to the transmission power control process 40, the transmitter TX initiates the sounding procedure $SP_1$ according to the current transmission power back-off level CPBL (full transmission power when the transmitter TX first performs a sounding procedure and thus the current transmission power back-off level CPBL is zero), where the transmitter TX and the receiver $RX_a$ exchanges the sound packets $SPT_1$ for channel estimation. Then, the receiver $RX_a$ estimates channel and replies the suggested transmission power back-off level $SPBL1_a$ along with the tone maps CTM for the current transmission power back-off level CPBL. Noticeably, the receiver $RX_a$ calculates the tone maps CTM according to per-tone SNR and the offset of the AC cycle, and estimates the suggested transmission power back-off level $SPBL1_a$ by considering per-tone SNR and the gain setting of the programmable gain amplifier (PGA) in the analog front-end (AFE).

Afterwards, after collecting enough channel information comprising the tone maps CTM and the suggested transmission power back-off levels $SPBL1_1$-$SPBL1_m$, e.g. channel information of all of the outgoing links $L_1$-$L_n$, a portion of the outgoing links $L_1$-$L_n$ collected within a time limit, or channel information of a portion of the outgoing links $L_1$-$L_n$ exceeding some threshold, the transmitter TX determines the new transmission power back-off level NPBL for the outgoing link $L_a$ (can be identical for all the outgoing link $L_1$-$L_n$). If the new transmission power back-off level NPBL is different from the current transmission power back-off level CPBL, the transmitter TX initiates the sounding procedure $SP_2$ according to the new transmission power back-off level NPBL, where the transmitter TX and the receiver $RX_a$ exchanges the sound packets $SPT_2$ for channel estimation.

Noticeably, when the transmitter TX determines to adjust the new transmission power back-off level NPBL, the transmitter TX invalidates the tone maps CTM estimated with the current transmission power back-off level CPBL different from the new transmission power back-off level NPBL. Besides, the channel estimation can be triggered in several ways, e.g. the transmitter TX can initiate the sounding procedure $SP_2$ immediately after determining the new transmission power back-off level NPBL is different from the current transmission power back-off level CPBL, or the transmitter TX can initiate the sounding procedure $SP_2$ when having data to send and having an invalid tone map or a tone map estimated with a power back-off level different from the new transmission power back-off level NPBL.

Then, the receiver $RX_a$ estimates channel and replies the tone maps NTM for the new transmission power back-off level NPBL and optionally the suggested transmission power back-off level $SPBL2_a$, where the receiver $RX_a$ replies the suggested transmission power back-off level $SPBL2_a$ different from the new transmission power back-off level NPBL when rejecting the new transmission power back-off level NPBL, e.g. a noise undetected when utilizing full transmission power is detected when utilizing the new transmission power back-off level NPBL. Finally, the transmitter TX utilizes the tone maps NTM for the new transmission power back-off level NPBL for continuing transmission, or reinitiates another round of sounding procedure for channel estimation if the suggested transmission power back-off level $SPBL2_a$ is different from the new transmission power back-off level NPBL.

Noticeably, the transmitter can adjust the new transmission power back-off level NPBL when a station (a receiver) joins or leaves the communication system. Besides, to avoid any risk of hidden nodes, it is important that the suggested transmission power back-off levels $SPBL1_1$-$SPBL1_n$ remains valid (i.e., no timeout like that for tone maps as specified) in the transmitter TX until either one of two conditions occurs:

(a) any of the corresponding receivers $RX_1$-$RX_n$ replace the suggested transmission power back-off levels $SPBL1_1$-$SPBL1_n$ with new suggested transmission power back-off levels, or (b) any of the corresponding receivers $RX_1$-$RX_n$ leave the network.

In other words, the lifetime of the suggested transmission power back-off levels $SPBL1_1$-$SPBL1_n$ does not end when the associated tone maps time out. As a result, the transmitter TX can determine the new transmission power back-off level NPBL according to the path losses of all outgoing links $L_1$-$L_n$ without further query channel information.

In the prior art, the PLC system has unique channel characteristics and access scheme, which complicates the transmission power control (TPC) scheme for the PLC system, such that the schemes based on cable length estimation can not work for complex powerline topology and provide no noise information, and the schemes purely based on the receiver's measurement will introduce new hidden nodes. In comparison, the transmitter TX of the present invention collects channel characteristics comprising the suggested transmission power back-off levels $SPBL1_1$-$SPBL1_m$ of the outgoing links $L_1$-$L_n$ from the receivers $RX_1$-$RX_n$ via the sounding procedure, and then utilizes the new transmission power back-off level NPBL, which is the lowest among the suggested transmission power back-off levels $SPBL1_1$-$SPBL1_m$, and corresponding tone maps NTM for continuing transmission, such that all the receivers $RX_1$-$RX_n$ can hear transmitted packets without hidden node problem while maximizing the benefit of transmission power back-off to increase power efficiency and data rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmission power control method for a communication system comprising a transmitter and a plurality of receivers, the transmitter coupled to the plurality of receivers via a plurality of corresponding outgoing links, the transmission power control method comprising:

the plurality of receivers replying a plurality of different first suggested transmission power back-off levels to the transmitter, wherein each of the plurality of receivers performs channel estimation for each of the plurality of corresponding outgoing links, and replies a respective first suggested transmission power back-off level to the transmitter; and the transmitter collecting the plurality of different first suggested transmission power back-off levels from the plurality of receivers and determining a new transmission power back-off level according to all of the plurality of different first suggested transmission power back-off levels, wherein the new transmission power back-off level is the same for all continuing transmissions to all of the plurality of receivers;

wherein the new transmission power back-off level is the lowest transmission power back-off level among the plurality of different first suggested transmission power back-off levels.

2. The transmission power control method of claim 1, wherein the new transmission power back-off level is per outgoing link or identical for all the outgoing links.

3. The transmission power control method of claim 1, wherein the new transmission power back-off level for an outgoing link is per tone, for a range of tones, or identical for a complete band.

4. The transmission power control method of claim 1, wherein the step of the each of the plurality of receivers performing channel estimation for the each of the plurality of corresponding outgoing links and suggesting the first suggested transmission power back-off level to the transmitter comprises:

the transmitter initiating a first sounding procedure according to a current transmission power back-off level to send first sound packets to the each receiver; and the each receiver estimating first channel characteristics and replying the transmitter with the first channel characteristics.

5. The transmission power control method of claim 4, wherein the first channel characteristics comprise first tone maps for the current transmission power back-off level and the first suggested transmission power back-off level.

6. The transmission power control method of claim 4, wherein the current transmission power back-off level is zero.

7. The transmission power control method of claim 1, wherein the plurality of first suggested transmission power back-off levels comprise first suggested transmission power back-off levels of all of the plurality of outgoing links, or first suggested transmission power back-off levels of a first portion of the plurality of outgoing links collected within a time limit, or first suggested transmission power back-off levels of a second portion of the plurality of outgoing links exceeding some threshold.

8. The transmission power control method of claim 1 further comprising:

the transmitter initiating a second sounding procedure according to the new transmission power back-off level to send second sound packets to the each receiver if the new transmission power back-off level is different from a current transmission power back-off level; and the each receiver estimating second channel characteristics and replying the transmitter with the second channel characteristics.

9. The transmission power control method of claim 8, wherein the second channel characteristics comprise second tone maps for the new transmission power back-off level and optionally a second suggested transmission power back-off level.

10. The transmission power control method of claim 9 further comprising:

the transmitter utilizing the second tone maps and the new transmission power back-off level for continuing transmission.

11. The transmission power control method of claim 10 further comprising:

the transmitter reinitiating a third sounding procedure to determine the new transmission power back-off level again according to the second suggested transmission power back-off level and the plurality of first suggested transmission power back-off levels if the second suggested transmission power back-off level is different from the new transmission power back-off level.

12. The transmission power control method of claim 8, wherein the step of the transmitter initiating the second sounding procedure according to the new transmission power back-off level to send the second sound packets to the each receiver comprises:

the transmitter initiating the second sounding procedure immediately after determining the new transmission power back-off level is different from the current transmission power back-off level.

13. The transmission power control method of claim 8, wherein the step of the transmitter initiating the second sounding procedure according to the new transmission power back-off level to send the second sound packets to the each receiver comprises:

the transmitter initiating the second sounding procedure when having data to send and having an invalid tone map or a tone map estimated with a power back-off level different from the new transmission power back-off level.

14. The transmission power control method of claim 1 further comprising:

the transmitter adjusting the new transmission power back-off level when a receiver joins or leaves the communication system.

15. The transmission power control method of claim 1 further comprising:

the transmitter invalidating tone maps estimated with a current transmission power back-off level different from the new transmission power back-off level.

16. The transmission power control method of claim 1, wherein the communication system is a powerline communication (PLC) system.

* * * * *